United States Patent [19]

Wagstaff et al.

[11] 3,793,792
[45] Feb. 26, 1974

[54] POWER KNIFE GRINDER FOR A FORAGE HARVESTER CAPABLE OF GRINDING FIRST AND SECOND BEVELS ON THE KNIVES OF THE FORAGE HARVESTER CUTTERHEAD

[75] Inventors: Robert A. Wagstaff; Thomas W. Waldrop, both of New Holland, Pa.

[73] Assignee: Sperry Rand Corporation, New Holland, Pa.

[22] Filed: Jan. 4, 1972

[21] Appl. No.: 215,615

Related U.S. Application Data

[63] Continuation-in-part of Ser. No. 183,392, Sept. 24, 1971.

[52] U.S. Cl.......................... 51/249, 51/288, 51/327
[51] Int. Cl............................ B24b 3/42, B24b 1/00
[58] Field of Search..... 51/246, 247, 249, 326, 327, 51/285, 288

[56] References Cited
UNITED STATES PATENTS

| | | | |
|---|---|---|---|
| 1,193,295 | 8/1916 | Perkins | 51/249 |
| 1,621,524 | 3/1927 | Cline | 51/249 |
| 1,807,975 | 6/1931 | Eyres | 51/249 X |
| 1,968,609 | 7/1934 | Madsen | 51/249 X |
| 2,245,968 | 6/1941 | Erdman | 51/249 |
| 2,735,248 | 2/1956 | West et al. | 51/246 |
| 2,978,848 | 4/1961 | Raine | 51/247 |
| 3,059,383 | 10/1962 | Wallin et al. | 51/246 |
| 3,331,167 | 7/1967 | Hoch | 51/246 |
| 3,479,776 | 11/1969 | Berg | 51/249 |

*Primary Examiner*—Othell M. Simpson
*Attorney, Agent, or Firm*—Frank A. Seemar; John R. Flanagan; Joseph Brown

[57] ABSTRACT

A powered knife grinder carried by a forage harvester and operable in one mode of operation to grind a first bevel on the forage harvester knives, and operable in a second mode of operation to grind a second bevel on each of the knives. The knife grinder includes a rotary abrasive member which is connected with the drive line to the forage harvester cutterhead when the knives are to be ground. During normal operation of the forage harvester when cutting crops the drive to the grinding means is disconnected. When grinding the first bevel on the forage harvester both the grinding means and the cutterhead are rotated, the grinding means being moved back and forth across the width of the cutterhead to grind the first bevel. During grinding of the second bevel, the drive to the cutterhead is disconnected, however, the drive to the grinding means is maintained and the grinding means is positioned along a radial inner surface of each knife to grind the second bevel. To facilitate the grinding of the second bevel, the cutterhead is spring biased against guide means carried by the grinding means to maintain each knife in its desired position with respect to the grinding means as the grinding means is moved back and forth across the width of the cutterhead during the grinding of the second bevel.

30 Claims, 12 Drawing Figures

POWER KNIFE GRINDER FOR A FORAGE HARVESTER CAPABLE OF GRINDING FIRST AND SECOND BEVELS ON THE KNIVES OF THE FORAGE HARVESTER CUTTERHEAD

CROSS REFERENCE TO RELATED APPLICATION

This application is a continuation-in-part of abandoned U.S. application Ser. No. 183,392 filed Sept. 24, 1971, and entitled "Forage Harvester Knife Sharpener with a Power Driven Abrasive Wheel and Knife Positioning Guide Pins for Grinding Relief Bevels."

This application also relates to the following patent applications all assigned to the same assignee as this application:

U.S. application Ser. No. 138,510 filed Apr. 29, 1971, and entitled "Reverse Drive for a Forage Harvester Cutting Reel" now U.S. Pat. No. 3,678,772.

U.S. application Ser. No. 138,540 filed Apr. 29, 1971, and entitled "Forage Harvester," now U.S. Pat. No. 3,730,441 and U.S. application Ser. No. 183,391 filed Sept. 24, 1971, and entitled "Forage Harvester Knife Sharpener with a Rotary Abrasive Wheel."

FIELD OF THE INVENTION

This invention relates generally to agricultural machinery and more particularly to a knife grinder for a forage harvester of the type having a rotatable cutterhead adapted to cooperate with a shear bar to cut crop material conveyed past the shear bar. The knife grinder of this invention is adapted to cut a first bevel on the knives of the cutterhead in one mode of operation, and in an alternative mode of operation the knife grinder is adapted to cut a second bevel on the knives of the rotatable cutterhead.

BACKGROUND OF THE INVENTION

In order to maintain the operating efficiency of a forage harvester of the type having a rotatable cutterhead with knives spaced on the periphery thereof, the knives cooperating with the shear bar to cut crop material, it is necessary to keep the knives sharp. It has been generally conventional to provide such a forage harvester with an abrasive stone which cooperates with the cutterhead during rotation thereof to grind the outer periphery of the knives. This grinding produces what is known as a first bevel. However, as the length of the first bevel increases the efficency of the cutterhead will go down even though a sharp edge is formed on said knife. This is due to the heel portion of the first bevel dragging against crop material in the forage harvester. It has long been recognized that forage harvester efficiency can be improved by forming a second bevel on the knife edge which extends at an angle to the first bevel to reduce the length of the heel of the first bevel. Thus, it is customary to install as original equipment knives having first and second bevels. During the normal operation of most commercially available forage harvesters the first bevel is periodically resharpened to maintain a good cutting edge. However, as the heel becomes progressively longer it is then necessary to regrind the second bevel. In the past this has been done in a variety of ways. One method involves holding the cutterhead in place within the machine and grinding the second bevel by hand. This method is generally not to satisfactory. Another method involves removing the knives from the machine and then grinding the second bevel when the knives are removed from the machine. While a satisfactory second bevel can be reformed in this manner it is a very time constuming task and also involves careful repositioning of the knives in the machine after they have been rebeveled. Recently an attachment has been made available for forage harvesters which consists of an electrically driven grinding wheel which is mounted on the forage harvester and advanced back and forth across the length of each knife to regrind the second bevel. While this attachment operates in a generally satisfactory manner it is relatively expensive as it requires a duplication of parts. In other words, a separate power source and a separate grinding means is required for grinding the second bevel.

SUMMARY AND OBJECTS OF THE INVENTION

According to the principles of this invention a method and apparatus is provided for grinding first and second bevels on the knives of a forage harvester cutterhead while the knives are mounted on the cutterhead with a single grinding means mounted on the forage harvester whereby the knives on the cutterhead can have a first bevel ground thereon during rotation of the cutterhead by advancing the grinding means into engagement with the radial outer periphery of the rotating cutterhead and moving the grinding means back and forth along the length of the knives until the first bevel is satisfactorily sharpened and then disposing the cutterhead in a free wheeling mode and biasing each individual knife in turn against guide pins while moving the grinding means, which is disposed into engagement with the knives behind the first bevel back and forth to satisfactorily grind a second bevel, this step being repeated for each of the knives of the cutterhead.

The principal object of this invention is to provide a knife grinder for a forage harvester which is operable in one mode of operation to grind the first bevel on the knives of the forage harvester, while the knives are mounted on the cutterhead of the forage harvester, and, in a second mode of operation to grind the second bevel on the knives, while the knives are still mounted on the cutterhead of the forage harvester.

It is a further object of this invention to provide a knife grinder of the type referred to in the preceding paragraph which utilizes only a single grinding means for grinding both first and second bevels.

It is another object of this invention to provide a grinding means for grinding first and second bevels of the knives in a forage harvester when the knives are mounted on the forage harvester cutterhead, the knife grinder utilizing a single source of power.

It is a further object of this invention to provide a novel method of grinding first and second bevels on the knives of a forage harvester.

It is a further object of this invention to position the knife and abrasive wheel in a substantially constant relation to one another over a range of diameters of the abrasive wheel and over a range of diameters of the cutting head.

Another object of this invention is to provide means on the knife sharpener that engages the cutting edge of a knife to properly position the abrasive wheel in relation to the relief bevel on the knife.

It is a further object to provide a novel method and apparatus for grinding second bevel on the knives of a forage harvester cutterhead.

These and other objects and advantages of this invention will be apparent to those skilled in the art after a consideration of the following detailed description taken in conjunction with the accompanying drawings, in which the preferred form of this invention is illustrated.

DESCRIPTION OF THE DRAWINGS

These viewes also illustrate the disposition of various drives, etc., when the knife grinder is disposed in the various positions.

DETAILED DESCRIPTION

In the following description right-hand and left-hand reference is determined by standing to the rear of the forage harvester and facing in the direction of travel.

IN GENERAL

Figure 1:
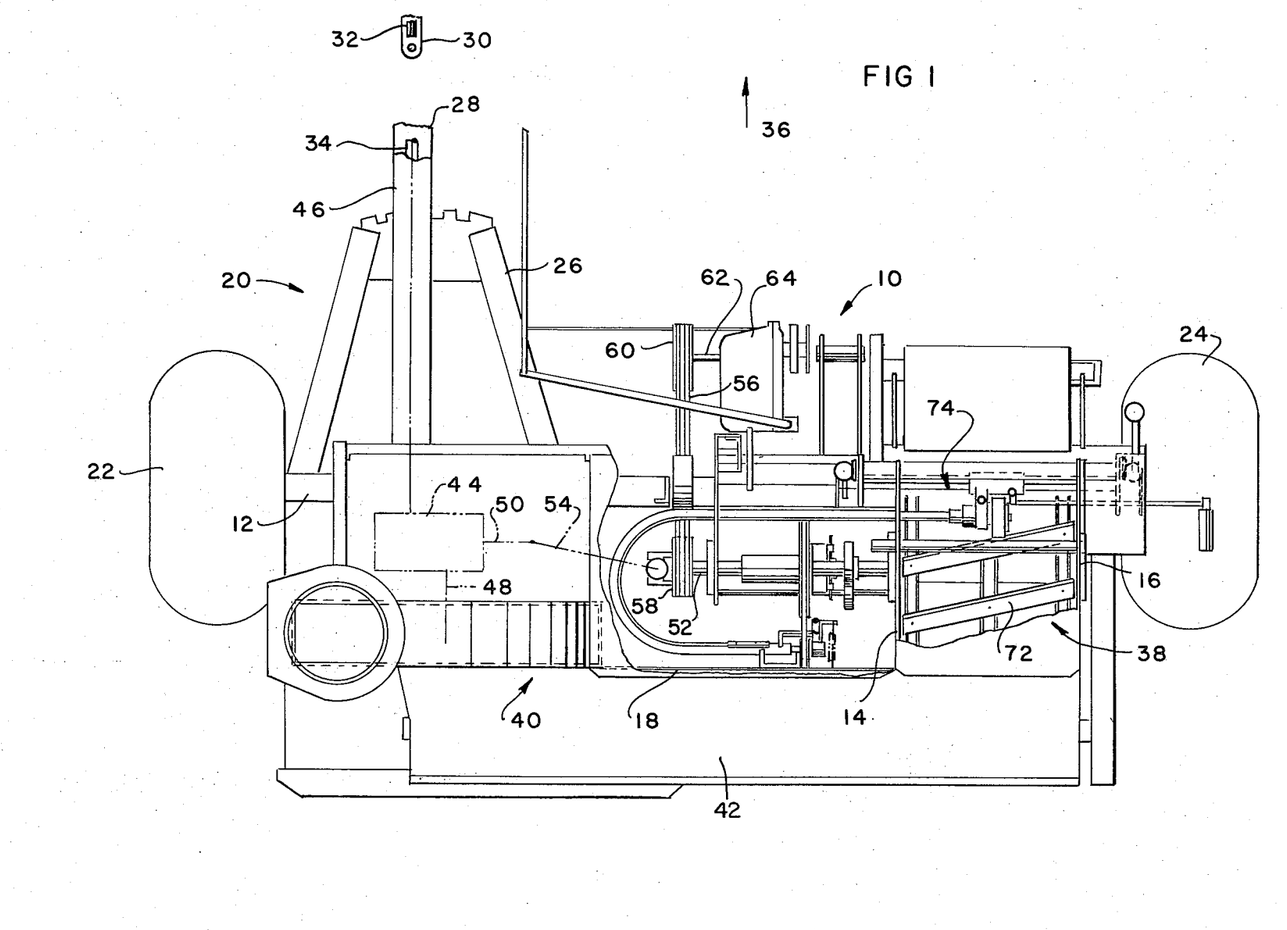
FIG. 1 is a plan view of a forage harvester employing the power knife grinder of this invention, this figure, as well as the other figures of the drawings, being drawn generally to scale.

Referring first to FIG. 1, a drawn forage harvester, indicated generally at 10 is shown in plan view. The forage harvester has a main frame including a transversely extending frame member 12, fore-and-aft extending side sheets 14, 16, a rear transverse frame member 18 and a forwardly extending hitch frame indicated generally at 20. The frame, which has only been partially illustrated and described, is supported upon left and right ground engaging wheels 22, 24, respectively. The hitch frame 20 includes a forwardly extending subframe 26 and a swingable hitch bar 28 which is adapted to be secured to the draw bar 30 of a tractor in a conventional manner. The tractor, of which the draw bar is a part, is a conventional farm tractor and is provided with a power takeoff shaft 32. The power takeoff shaft 34 of the forage harvester 10 is adapted to be connected to the power takeoff shaft 32 in a convention manner. As can be seen from the foregoing, when the forage harvester 10 is secured to the tractor, the forage harvester can be propelled in a forward direction (indicated by the arrow 36) by the tractor, the tractor also supplying power to the various operative components of the forage harvester through the power takeoff shaft 32 of the tractor.

Mounted on the frame of the forage harvester is a cutterhead, indicated generally at 38, and a blower, indicated generally at 40. Extending between the cutter head 38 and the blower 40 is an auger trough 42 through which material cut by the cutterhead may be conveyed to the blower 40. A gearbox 44 is also mounted on the forage harvester frame. The power takeoff line 34 extends forwardly from the gearbox 44 to the tractor power takeoff shaft 32, the power takeoff line being disposed beneath a power line shield 46. The gearbox is provided with two output shafts, one of them, 48, being connected directly to the fan within the blower 40. The other output shaft 50 is interconnected with the drive means which rotates the forage harvester cutterhead and which also supplies power to various other operative components of the forage harvester and to the power knife grinder in a manner more fully set forth below. It should however be noted at this point that the output shaft 50 is connected to a main drive shaft 52 through a double universal joint drive line 54. A belt drive 56 extends forwardly from sheave 58 mounted on the main drive shaft 52 to a sheave 60 carried on input shaft 62 of gearbox 64. The gearbox 64 in turn has an output which is connectable to various forage harvester attachments which are adapted to be mounted on the forage harvester frame forwardly of the cutterhead 38. These attachments customarily include those devices which deliver the crop material to the forage harvester cutterhead, the crop material being conveyed rearwardly by upper and lower feed rolls 66, 68, respectively (FIG. 2) over a shear bar 70. As the cutterhead is caused to rotate in a forward direction the knives 72 carried by the cutterhead will engage the crop material being conveyed rearwardly over the shear bar 70 and cut this material into relatively small pieces.

Figure 7:
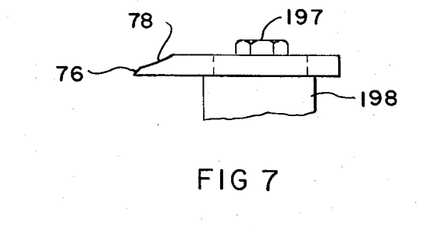
FIG. 7 illustrates the cross section of one of the knives of the cutterhead and more clearly illustrates the shape of the first and second bevels.
Figure 8:
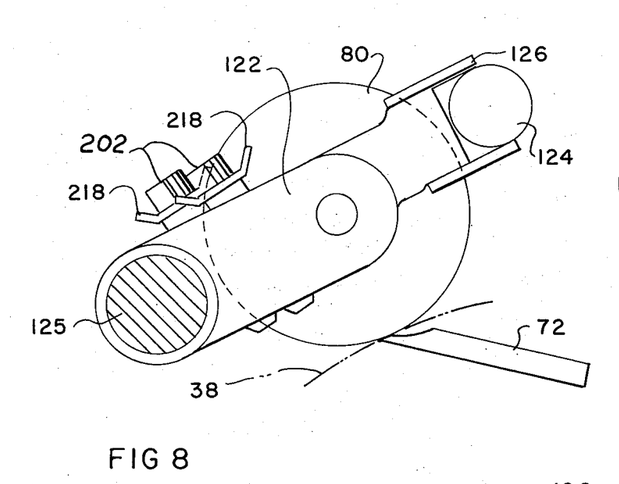
FIG. 8 illustrates the manner in which the power knife grinder is disposed when cutting the first level on the knives of the cutterhead.

To maintain cutting efficiency of the forage harvester it is necessary to maintain the knives 72 in a sharpened condition. In order to sharpen the knives a powered knife grinder, indicated generally at 74, is mounted on the left and right side sheets 14, 16 of the frame. According to the principles of this invention, the knife grinder 74 may be disposed in either a first grinding position for cutting a first bevel 76 (FIG. 7) on a knife, or in a second grinding position for cutting a second bevel 78 on the knife. Alternatively, the power knife grinder may be disposed in an inoperative mode while the cutterhead is being rotated to cut forage crops conveyed rearwardly over the shear bar 70.

The powered knife grinder includes: grinding means, indicated generally at 79, the grinding means including a rotatable abrasive member 80; disconnectable drive means, indicated generally at 82, between the cutterhead drive means 52 and the grinding means 79; means, indicated generally at 84, operable to move the grinding means 79 towards and away from the cutterhead 38; and means, indicated generally at 86, operable to move the grinding means back and forth along the width of the cutterhead.

Before describing all the constructional details of the powered knife grinder, a brief summary of its different modes of operation will be given.

SUMMARY OF OPERATION

Figure 10:
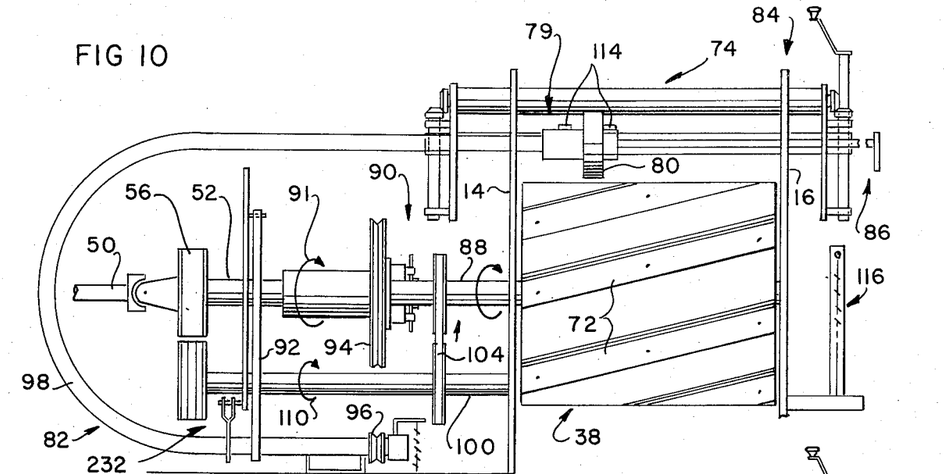
FIGS. 10, 11 and 12 represent the power knife grinder in, respectively, an inoperative position, in position to cut a first bevel, and in the position wherein it is cutting a second bevel on one of the knives.

Referring to FIG. 10, the powered knife grinder is shown in this figure in an inoperative position. In this position the rotatable abrasive wheel 80 is disposed away from the outer radial periphery of the cutterhead 38 and it is customary not to drive the grinder in this position. In this mode of operation the main drive shaft 52 is connected to the cutterhead drive shaft 88 through a clutch, indicated generally at 90, the clutch being disposed in its normal clutching position. The main drive shaft 52 will be rotated in the direction indicated by the arrow 91, and the cutterhead will also be rotated in this direction, which is referred to as its forward direction of rotation. As the cutterhead rotates in this direction the leading or cutting edge of the knives 72 will cut crop material conveyed rearwardly over the shear bar 70.

Figures 11, 12:
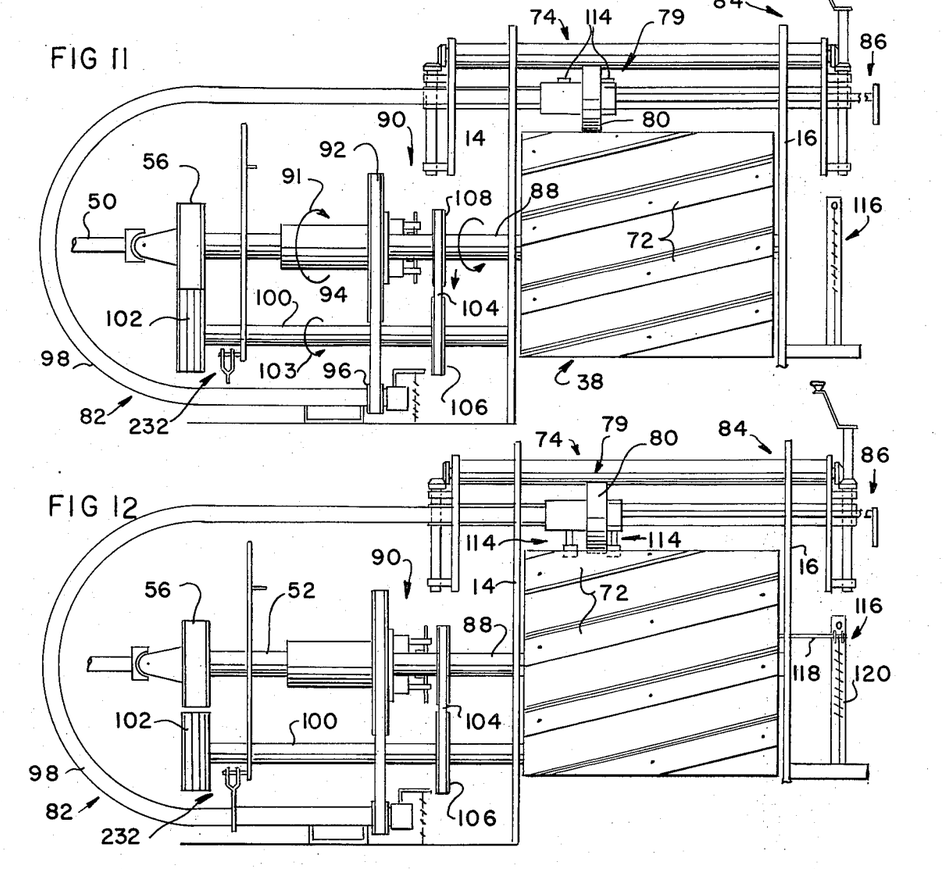

If it is desired to grind the first bevel 76 on the knives of the forage harvester, the first bevel lying in the circumference of the cutterhead, the grinding wheel 80 is moved from its inoperative shown in FIG. 10 to it first grinding position shown in FIG. 11 by the means 84 operable to move the grinding means towards and away from the cutterhead. This disconnectable drive means 82 between the cutterhead drive means and the rotatable abrasive structure 80 is disposed in its connected position. In this position the grinding means drive belt 92 is moved from its disconnected or storage position, shown in FIG. 10, to its driving position wherein it is disposed over a sheave 94 on the main drive shaft 52 and a sheave 96 operatively interconnected with a flexible drive line 98. The rotary abrasive stone 80 is in turn connected with the flexible drive line 98 in a manner which will be more fully brought out below. When the grinding means 79 before has been moved into its first grinding position by the moving means 84, it is then necessary to rotate the cutterhead in order to grind the first bevel. The cutterhead may be rotated in either a forward direction, or, preferably, in a reverse direction. To achieve reverse direction rotation, the clutch 90 is shifted from its clutching position, shown in FIG. 10, to its disengaged position, shown in FIG. 11. Jack shaft 100 is then driven by engaging the friction wheel 102 with the belt drive 56 as it passes over sheave 58. The jack shaft, which is now rotating in the direction of the arrow 103, will drive the cutterhead 38 in a reverse direction, as the shaft 88 is driven through belt 104 which passes over sheave 106 on the jack shaft and 108 on the cutterhead drive shaft. It should be noted at this point that a belt 104 is always disposed over sheaves 106 and 108, and in the mode of operation illustrated in FIG. 10, it will cause the jack shaft 100 to rotate in the direction indicated by the arrow 110. As the cutterhead is being rotated in its reverse direction as shown in FIG. 11, it is necessary to move the grinding means 79 back and forth across the width of the cutterhead to grind the leading edge along the length of each knife. To this end, handle means 86 is provided which can be manually engaged to move the grinding means back and forth across the width of the cutterhead.

When grinding the second bevel the grinding means is disposed in the manner illustrated in FIG. 12. In this mode of on the second bevel is ground one one knife at a time. Thus, it is essential that the drives to the cutterhead be disconnected. Accordingly, the clutch 90 is again disposed in its inoperative or disconnected position and the friction wheel 102 is also held away from the drive belts 56 so that the jack shaft 100 will not be driven. In this mode the flexible power line 98 is still connected to the main drive shaft through belt 94 and therefore, the grinding wheel will be caused to rotate when the output shaft 50 of gearbox 44 is caused to rotate. In order to grind the second bevel 78 means are provided to hold the grinding means along a radial inner surface of each knife. These means include guide pins 114 which are disposed in such a manner as to be engageable with the leading edge of each knife 72 and means operable to bias each knife stays in engagement with the guide means as the grinding means are moved back and forth across the width of the cutterhead. The biasing means, indicated generally at 116, include a rod 118 engageable with the cutterhead and projecting laterally outwardly therefrom when in its engaged position, and a spring 120 engageable with one end of the rod 118 and operable to bias the cutterhead in a forward direction. When the grinding means is disposed in its inoperative position (FIG. 10) or in its first mode (FIG. 11) the guide pins 114 and the biasing means 116 are disposed in an inoperative position.

DETAILS OF THE POWER KNIFE GRINDER

Referring now to FIGS. 2 through 6, 8 and 9, the details of the power knife grinder 79 will be more fully described. The grinding means 79 includes a carriage or carrier 122 which is supported at one end on a fixed cylindrical shaft 124 and, at the other end, on a moveable cylindrical shaft 125. The fixed shaft 124 is mounted on and extends between a left and right side sheets 14, 16, respectively, as can best be seen from FIG. 3. The movable shaft 125 is supported for movement towards and away from the rotatable cutterhead 38 by the moving means 84 in a manner more fully set forth below. The carriage 122 has a yoke portion 126 slideably disposed to either side of the fixed shaft 124, as can best be seen in FIGS. 8 and 9. The rotary abrasive wheel 180 is rotatably supported on the carriage 122 between the fixed and movable shaft 124, 125. As the movable shaft is moved towards and away from the periphery of the cutterhead the abrasive wheel will move in and out of grinding relationship with the knives of the cutterhead.

Figures 2, 3:
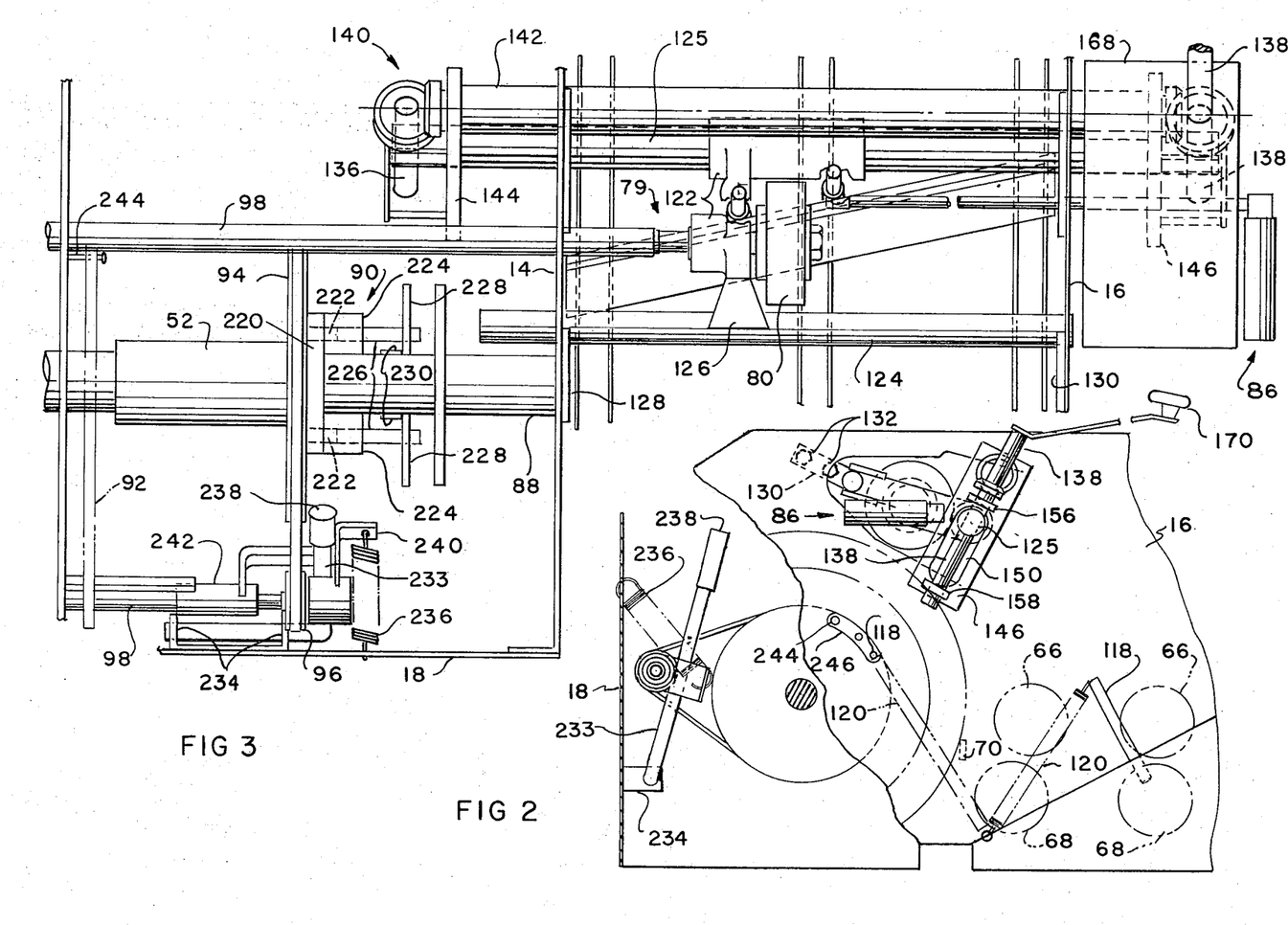
FIG. 2 is a right side view of a portion of the forage harvester showin in FIG. 1.
FIG. 3 is an enlarged plan view of a portion of the forage harvester shown in FIG. 1, this view illustrating the power knife sharpener disposed in position for grinding a second bevel on one of the knives of the forage harvester cutterhead.
Figures 4, 6:
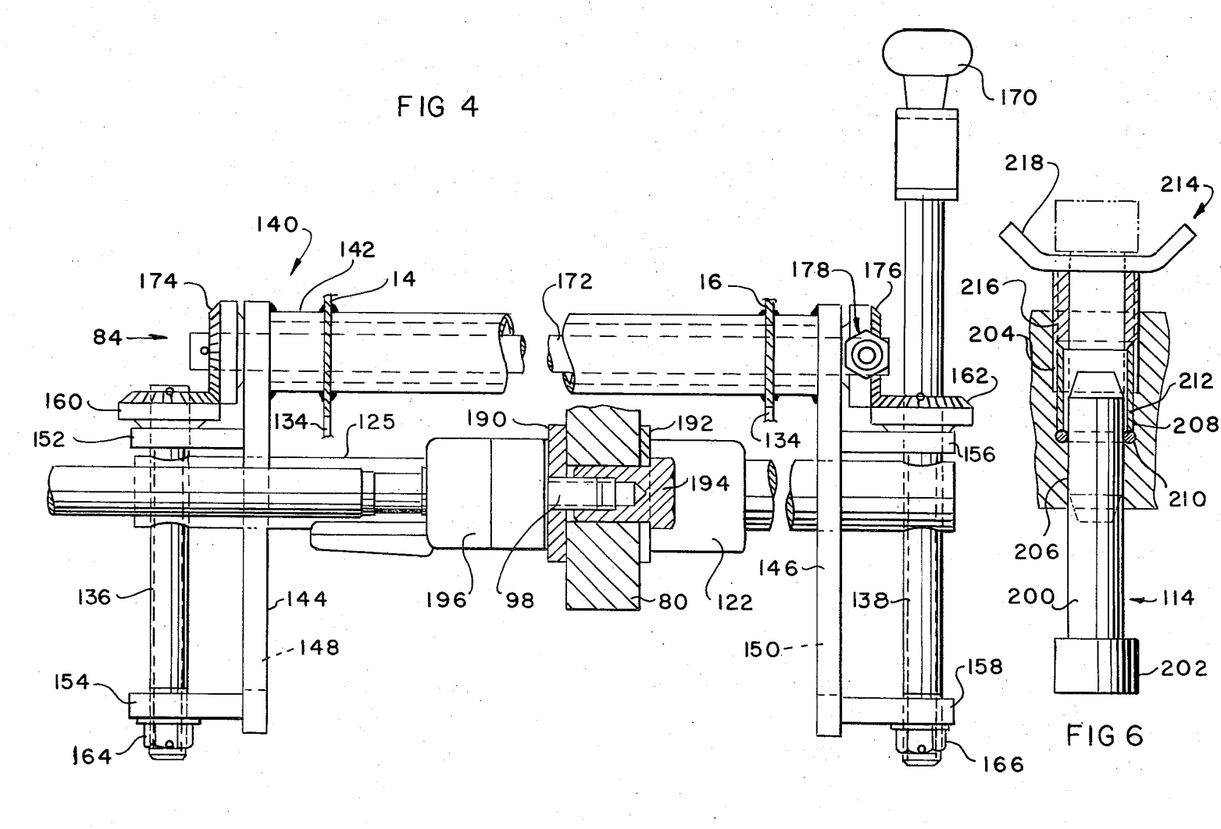
FIG. 4 is a rear view of a portion of FIG. 3 illustrating the means by which the power knife grinder can be adjusted towards and away from the periphery of the cutterhead.
FIG. 6 illustrates the manner in which the guide pins, carried by the knife grinder, are held in their operative and inoperative positions.
Figure 5:
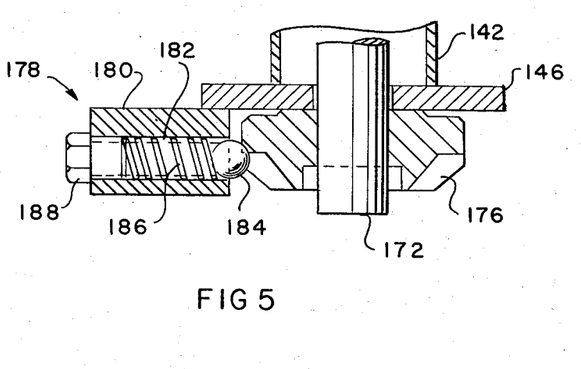
FIG. 5 illustrates a portion of the adjusting means shown in FIG. 4.

The fixed shaft 124 is mounted between the walls 14 and 16 by left and right brackets 128, 130, respectively, (FIGS. 2 and 3). The brackets are welded to the shaft 124 and are bolted to the walls 14, 16, by bolts 132. The shaft 124 is positioned rearwardly of the movable shaft 125. The walls 14 and 16 have openings 134 (FIG. 2) through which the grinding means extends to the outer sides of the walls. As can best be seen from FIG. 3, the cylindrical shaft 124 extends through both openings for permitting the grinding stone to be moved fully across the length of each of the knives and to move clear of the knives at either end for a uniform grinding of both the first and second bevels along the lengths of the knives.

The opposite ends of the adjustable cylindrical shaft 125 are provided with threaded apertures which receive threaded shafts 136, 138. A rigid frame, indicated generally at 140, supports the threaded shafts 136, 138 and comprises a hollow cylindrical tubular cross beam 142 extending to the outer sides of the walls 14, 16, the beam carrying bar like mounting members 144, 146 extending perpendicularly to the cross beam 142 and inwardly towards the cutterhead 38. The beam 142 is welded to the side walls 14, 16 and the mounting members 144, 146 are welded to the beam. The mounting members 144, 146 have longitudinally extending openings 148, 150 through which the ends of the adjustable cylindrical shaft 125 extend. The threaded shafts 136, 138 are rotatably mounted in the spaced apart brackets 152, 154, 156, 158 which are welded to the bar like members 144, 146, the brackets extending away from the cutterhead 38. The threaded shafts are held against longitudinal movement by bevel gears 160, 162 and nuts 164, 166 which are pinned to the ends of the respective threaded shafts to prevent relative rotation thereto. The shafts 136, 138 therefore firmly hold the cylindrical adjustable shaft 125 against lateral and longitudinal movement. The only movement of the adjustable shaft 125 is the linear movement along the threaded shafts as these shafts are rotated to adjust the position of the abrasive wheel 80. The threaded shaft 138 extends upward through the shield 168 (FIG. 3) guarding the end of the knife sharpener. On the upper end of the shaft is a knobbed handle 170 for manually rotating the shaft. The threaded shaft 138 is connected to the threaded shaft 136 by a cross shaft 172 having beveled gears 174, 176 meshing with the beveled gears 160, 162 mounted on the threaded shafts 136, 138, respectively. The cross shaft 172 extends through the hollow cross beam 142 and is rotatably mounted in the bar like mounting members 144, 146. Thus rotational movement of the handle 170 on shaft 138 will impart equal rotational movement to shaft 136. The adjustable shaft is thus moved evenly inwardly and outwardly with respect to the cutterhead and is held firmly in position by the threaded shafts 136 and 138.

In the grinding operation of the first bevel the abrasive wheel 80 is indexed forwardly at the end of each pass by rotation of the handle 170 for measuring the amount of inward movement of the abrasive wheel. A detent, indicated generally at 178 (FIG. 5), is mounted on the side of the bar like member 146 to indicate the movement of the adjusting means. The detent 178 comprises a base 180 with a bore 182 extending radially from the beveled gear 176, a pawl 184 pressed against the teeth of the beveled gear 176 by a spring 186 compressed by a bolt 188 threaded into the bore 182. As the gear 176 rotates an audible click occurs when the pawl recesses between the gear teeth. The inward movement can be determined from these clicks. Usually, the abrasive wheel 80 is positioned by a single click for each pass of the abrasive wheel 80 across the width of the cutterhead.

The threaded shaft 136, 138 are firmly held at each end and the adjustable shaft 125 moves in a plane passing through the cutterhead to impart a linear movement to one end of the carrier 122. The other end of the carrier 122 rotates about the fixed shaft 124 as said one of the carrier is adjusted, the yoke portion 126 also providing for a limited sliding movement of the carrier 122 towards and away from the fixed shaft.

The abrasive wheel 80 is removably mounted on one end of the flexible drive shaft 98 by the circular washers 190, 192 (FIG. 4) on opposite sides of the abrasive wheel. Bolt 194 fits in the center hole in the abrasive wheel and is threaded on the end of the drive shaft 98 to secure the abrasive wheel thereto. The drive shaft 98 is rotatably mounted in the boss 196 of the carrier parallel to the adjusting shaft 125 and the fixed shaft 124. The abrasive wheel can be replaced by the removal of the bolt 194. The abrasive wheel is used until worn to a minimum diameter and is then replaced by a new wheel. Thus, in addition to the inward and outward movement of the abrasive wheel as it is adjusted, the abrasive wheel may change in diameter as it is worn and subsequently replaced.

Another variable effecting relationship of the abrasive wheel with respect to the knife is the diameter of the cutting cylinders. As the first bevel of the knives are constantly reground the diameter of the cutterhead will be reduced unless of course the knives are repositioned by loosening the knife holding stud 197 (FIG. 7) and moving the knife outwardly (to the left in FIG. 7) on the mounting blocks 198 which are in turn carried by the cutterhead. Thus, if the knife is not readjusted the cutting edges will subscribed a cutting cylinder of reduced diameter. In positioning the grinding means to cut the second bevel it is necessary that the guide pins 114 maintain a proper relationship between the second bevel and the first bevel over the various relationships of cutterhead diameter and abrasive wheel diameter, and also as the stone moves towards and away from the cutterhead as the adjusting means is adjusted to compensate for difference in the various diameters. To compensate for differences in the various diameters the guide pins 114 are angularly mounted on opposite sides of the abrasive wheel to maintain a carrier in the desired contact with a knife edge as the carrier is moved from side to side along the length of each of the knives while sharpening the second bevel. The guide pins have cylindrical stem portions 200 (FIG. 6) with rollers 202 mounted on the ends thereof, the rollers being adapted to roll along the knife edge. The mountings of the guide pins in the carrier are the same and a description of the mounting of one guide pin will sufice for both. The stem of each mounting pin 200 fits into a stepped bore 204. The lower stepped portion 208 has a diameter slightly greater than the diameter of the stemmed portion 200 and is adapted to closely embrace the stem portion 200. The intermediate stepped portion 208 is larger and has an O-ring 210 at the bottom thereof which is pressed into holding engagement with the stem portion 200 by sleeve 212. The sleeve 212 is forced into holding engagement by a nut 214 which is threaded into a larger bore portion 216, which is disposed on the opposite side of the carrier from the bore portion 206. The nut 216 has wing portions 218 for manual tightening of the guide pins into the socket. Thus, as the nut is tightened the sleeve 212 will be forced into engagement with the O-ring 210, compressing the O-ring into engagement with the stem portion 200. In the full lines of FIG. 6, the guide pin is in guiding relationship with the knife edge. In the dot-dash position of that figure the guide pin is in its storage position. The guide pin will be carried in the storage position except for grinding of the second bevel.

Figure 9:
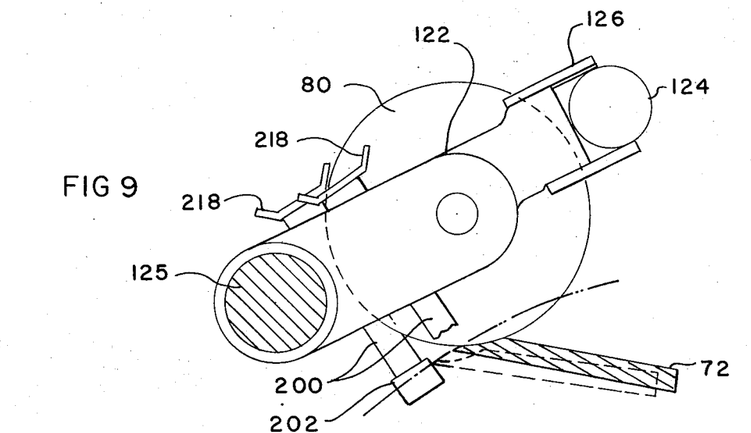
FIG. 9 illustrates the manner in which the power knife grinder is disposed when cutting the second bevel on one of the knives of the forage harvester cutterhead.

In FIG. 9 a new abrasive wheel is shown which is at its largest diameter. As can be seen from FIG. 9, the guide pins 114 are at an angle to the carrier. The rollers 202 on the guide pins are positioned to be intersected by a peripheral plane tangential to the grinding of the abrasive wheel when forming the second bevels. The guide pins are on opposite sides of the grinding wheel to engage sections of the knife on either side of the wheel 80 to position the section of the knife between the guide pins in proper grinding contact with the abrasive wheel as can be seen from FIGS. 3 and 9.

CUTTERHEAD CLUTCH

As has previously been noted from the summary of operation of the various modes of the knife grinder, it is necessary to disconnect the main drive to the cutterhead 38 through the operation of a clutch indicated generally at 90. This clutch consists of a first fixed clutch member 220 (FIG. 3) rigidly secured to the main drive shaft 52 to the right of sheave 94, the fixed clutch member being provided with spaced apart apertures 222. A second clutch member 224 is rigidly secured to the cutterhead drive shaft 88. The cutterhead drive shaft is not drivingly connected to the main drive shaft 52 except through the clutch 90. The second clutch member carries shiftable dogs 226 which may be disposed in the apertures 222 in the first clutch member 220 to effect a drivingly relationship between the first and second clutch members 220, 224, respectively. In order to move the dogs from their clutching position to their disengaged position it is necessary to withdraw the dogs 226 from the apertures 222. To this end rods 228 are provided, the rods being mounted in the right hand end of the dogs 226 and manually engageable to shift the dogs from their left hand clutching position, shown in FIG. 3, to their right hand disengaged position. Each of the rods 228 is biased inwardly towards the cutterhead drive shaft 88 by spring means not shown, and when shifting from the clutching position to the disengaged position, the rods 228 are first shifted outwardly against the spring pressure, and then moved to the right over lugs 230 until they are past the lugs at which point the rods are released against the spring pressure, the spring pressure then holding the pins in their disengaged positions and not permitting accidental insertion of the pins into the corresponding apertures 222. The left-hand end of the cutterhead drive shaft 88 is provided with a pilot member (not shown) which is received by a pilot bore (also not shown) in the main drive shaft 52, the pilot holding the shafts 88 and 52 in axial alignment.

CUTTERHEAD REVERSE DRIVE

The manner in which the friction wheel 100 is moved into and out of disengagement with the belt drive 56 is not material to this invention, however, it should suffice to note that an over center linkage arrangement is provided, this linkage arrangement is provided, this linkage arrangement being indicated generally at 232. In the over center position the friction wheel 102 is engaged as shown in FIG. 11, and in the other position of the over center linkage arrangement the friction wheel is disengaged as shown in FIGS. 10 and 12. The over center linkage arrangement is more fully illustrated in co-pending application Ser. No. 138,510 filed Apr. 29, 1971.

POWER KNIFE GRINDER DRIVE

The driving end of the flexible drive shaft 98 is carried on a pivoted L-shaped lever 232 (FIGS. 2 and 3) and lower portion being generally parallel to the drive sheaves 52 and 88 and mounted on spaced apart brackets 234 secured to and extending forwardly from the rear transverse frame member 18. A spring 236 normally biases the upper portion of the lever, which carries a handle 238, rearwardly towards frame member 18. The intermediate portion of the lever 232 is provided with bracket means, one end of which 240 is connected to the spring 236, and the other end of which supports the sheave 96 and the sheath 242 of the flexible drive line 98. To connect the disconnectable drive 82, it is necessary to shift the belt 92 from its storage position, shown in broken lines in FIG. 3, to its drive position, shown in full lines in FIG. 3. In the storage position one end of the belt is disposed over the flexible drive line 98, and another over a stud 244 carried by a portion of the forage harvester frame. As the spring biases the handle 238 rearwardly the belt will be held in a tension position when its in its storage position and will not shift out of its storage position. To move the belt into its driving position the handle 238 is pushed forwardly and one end of the belt is disposed over the sheave 94, and the other end is disposed over the sheave 96. The handle is then released, and the spring will then hold the belt in its proper driving tension. Therefore, the drive to the grinding means can readily be established and disconnected.

CUTTERHEAD BIASING MEANS

Finally, reference was made in the description of the operation of this device to the cutterhead biasing means. As this device is only schmetically illustrated in FIGS. 10, 11 and 12, reference is now directed to FIG. 2. This figure shows the biasing device in its storage position in full line and in its normal operative biasing position in phanton lines. In the storage position one end of the rod 118 is disposed within an aperture in the frame of the forage harvester, the spring then being in a more or less retracted position. In its biasing position, shown in phantom, the rod is inserted into one of a plurality of spaced apart apertures 244 in the cutterhead, the rod passing through an arcuate slot 246 in the side sheet 16. In actual practice the cutterhead of the forage harvester is provided with at least 24 spaced apart apertures 244 so that any of the knives mounted on the forage harvester can be advantageously positioned for grinding of the second bevel. When the rod is disposed in the aperture, the spring is somewhat tensioned as can be seen best from FIG. 2.

CONCLUSION

As the operation of the power knife sharpener of this invention has been fully set forth it will not be repeated here. However, it should suffice to note that the foregoing described power knife sharpener may advantageously sharpen first and second bevels on the knives of the forage harvester having a rotating cutterhead. This can be accomplished in the field or in any location by utilizing the tractor power. The power driven stone which is utilized to cut both bevels provides a faster grinding of the first bevel then is conventionally accomplished with a stationary stone. Furthermore, it should be noted that this power grinder requires very little maintenance, and when necessary, the grinding wheel can be very easily replaced.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention what we claim is:

1. A method of grinding first and second bevels on the knives of a forage harvester cutterhead while the knives are mounted on the cutterhead with a single grinding means mounted on the forage harvester comprising steps of:
   A. connecting a drive to the cutterhead and rotating the cutterhead;
   B. advancing the grinding means into engagement with the radial outer periphery of the rotating cutterhead;
   C. moving the grinding means back and forth along the length of the rotating knives to grind the radial outer periphery of the knives;
   D. repeating the advancing and moving steps until a satisfactory first bevel is ground on the radial outer periphery of the knives of the rotating cutterhead;
   E. disconnecting said drive to the cutterhead and disposing the cutterhead in a free-wheeling mode;
   F. advancing said grinding means into engagement with one of the knives and a location spaced slightly inwardly of the first bevel;
   G. moving said grinding means back and forth along the length of said one knife to grind a second bevel;
   H. repeating the advancing and moving steps F and G until a satisfactory second bevel is ground on said one knife; and
   I. repeating steps F, G and H with each of the other knives on the cutterhead until a satisfactory second bevel is ground on all the knives.

2. The method of claim 1 further characterized by the steps of:
   J. providing the grinding means with a guaging means engageable with the leading edge of one of the knives, and
   K. biasing the leading edge of each knife being ground into engagement with the guaging means during steps F and G of Claim 1.

3. The method of claim 1 wherein the single grinding means is a rotatable abrasive member, further characterized by the steps of:
   L. rotating the abrasive member.

4. A knife grinder for a forage harvester of the type having a frame, a shear bar mounted on the frame, a rotatable cutterhead mounted on the frame, said cutterhead carrying a plurality of knives which cooperate with the shear bar upon forward rotation of the cutterhead to cut crop material conveyed past the shear bar, said knife grinder comprising:
   grinding means mounted on the frame of the forage harvester adjacent the said cutterhead at a location spaced outwardly of the periphery of the cutterhead;
   means operable to move said grinding means towards and away from said cutterhead to dispose the grinding means in either a first grinding position for cutting a first bevel on the knives of the rotatable cutterhead, a second grinding position for cutting a second bevel on the knives of the cutterhead, or in a third inoperative position spaced radially outwardly of said cutterhead;
   means operable to move said grinding means back and forth across the width of the cutterhead when said grinding means is disposed in either of the said first or second positions;
   drive means operable to rotate said cutterhead whereby a first bevel can be ground on the outer periphery of the knives as the knives rotate past the grinding means when the grinding means is disposed in its first position and as the grinding means is moved back and forth across the width of the cutterhead;
   means operable to disconnect the cutterhead drive means to permit the cutterhead to free-wheel; and means operable to hold the grinding means along a radially inner surface of each of the knives when the grinding means is disposed in the second grinding position whereby a second bevel can be ground on the knives radially inwardly of the first bevel as the grinding means is moved back and forth across the width of the cutterhead.

5. A knife grinder as set forth in claim 4, wherein the grinding means is provided with guide pins engageable with the leading edge of each knife during the grinding of the second bevel.

6. A knife grinder as set forth in claim 5, wherein spring means are provided to bias the leading edge of each knife into engagement with said guide pins.

7. A knife grinder as set forth in claim 4, wherein each knife is mounted on the periphery of the cutterhead at an angle to the radius of the cutterhead, the first bevel being ground on a tangent to the cutterhead.

8. A knife grinder as set forth in claim 4, wherein said grinding means includes a rotatable abrasive grinding wheel mounted on an axis parallel to the axis of rotation of the cutterhead.

9. A knife grinder as set forth in claim 4, wherein said grinding means includes a carriage mounted for movement parallel to the axis of rotation of said cutterhead, and the means operable to move said grinding means back and forth across the width of the cutterhead includes a manually engageable handle projecting outwardly of the frame of the forage harvester, said handle being connected to said carriage.

10. A knife grinder as set forth in claim 9, wherein said grinding means comprises a rotary abrasive member mounted on said carriage and rotatable about an axis parallel to the axis of rotation of said cutterhead.

11. A knife grinder as set forth in claim 4, wherein the cutterhead drive means rotates said cutterhead in a rearward direction during the grinding of the first bevel.

12. In combination with a forage harvester of the type having a frame adapted to be propelled forwardly over a field of crop bearing material, a shear bar mounted on said frame, a rotatable cutterhead mounted for rotation about a generally transverse axis and having a plurality of knives mounted on its radial outer periphery, drive means operable to rotate said cutterhead in a forward direction whereby crop material conveyed past said shear bar will be cut by said knives during forward rotation of said cutterhead; a powered knife grinder comprising grinding means mounted on the frame adjacent the periphery of said cutterhead; means operable to move said grinding means towards and away from said cutterhead between an inoperative grinding position, through a first grinding position wherein said grinding means can grind a first bevel on the knives of said cutterhead, and to a second grinding position wherein said grinding means can grind a second bevel on the knives mounted on said cutterhead; means operable to move said abrasive structure back and forth across the width of said cutterhead when said grinding means is disposed in its first grinding position; whereby a first bevel can be cut on said cutterhead knives during rotation of said cutterhead, clutch means operable to disconnect said cutterhead from said cutterhead drive means; and means operable to hold the grinding means along a radial inner surface of each of the knives when said clutch means is disconnected and said knife is disposed in its second grinding position whereby a second bevel can be ground on each of the knives radially inwardly of the first bevel as the grinding means is moved back and forth across the width of the cutterhead.

13. The combination set forth in claim 12, wherein said grinding means comprises a rotatable abrasive structure mounted for rotation about an axis generally parallel to the axis of said cutterhead, and further characterized by the provision of drive means interconnecting said rotatable abrasive structure with said forage harvester cutterhead drive means.

14. The combination set forth in claim 13, wherein said drive means for the rotatable abrasive structure is disconnectable from the drive means of the forage harvester cutterhead whereby the forage harvester cutterhead may be rotated to cut crop material conveyed past said shear bar without rotation of said rotary abrasive structure.

15. The combinations set forth in claim 12, wherein the means operable to hold the grinding means along a radial inner surface comprises guide pins carried by and movable with the grinding means, and biasing means operable to bias the leading edge of each of the knives into engagement with said guide means when said clutch means is disconnected.

16. A method of grinding second bevels on the knives of a forage harvester cutterhead while the knives are mounted on the cutterhead with a grinding means mounted on the forage harvester, said knives being provided with a first bevel, comprising steps of:
A. disposing the cutterhead in a free-wheeling mode;
B. providing the grinding means with a gauging means engageable with the leading edge of one of the knives;
C. advancing said grinding means into engagement with one of the knives at a location spaced slightly inwardly of the first bevel and biasing the leading edge of said one knife to be ground into engagement with the gauging means;
D. moving said grinding means back and forth along the length of said one knife to grind a second bevel while the leading edge of said knife is continuously biased into engagement with said gauging means;
E. repeating the advancing and moving steps C and D until a satisfactory second bevel is ground on said one knife; and
F. repeating steps C, D and E with each of the other knives on the cutterhead until a satisfactory second bevel is ground on all the knives.

17. The method of claim 16 wherein the single grinding means is a rotatable abrasive member, further characterized by the steps of:
G. rotating the abrasive member.

18. A knife grinder for a forage harvester of the type having a frame, a shear bar mounted on the frame, a rotatable cutterhead mounted on the frame, said cutterhead carrying a plurality of knives which cooperated with the shear bar upon forward rotation of the cutterhead to cut crop material conveyed past the shear bar, said knives having first and second bevels, said knife grinder comprising:
grinding means mounted on the frame of the forage harvester adjacent the cutterhead at a location spaced outwardly of the periphery of the cutterhead;
means operable to move said grinding means towards and away from said cutterhead to dispose the grinding means in either a grinding position for regrinding second bevel on the knives of the cutterhead, or in an inoperative position spaced radially outwardly of said cutterhead;
means operable to move said grinding means back and forth across the width of the cutterhead when said grinding means is disposed in said grinding position; and
means operable to hold the grinding means along a radially inner surface of each of the knives when the grinding means is disposed in the grinding position whereby the second bevel can be reground on the knives radially inwardly of the first bevel as the grinding means is moved back and forth across the width of the cutterhead.

19. A knife grinder as set forth in claim 18, wherein the grinding means is provided with guide pins engageable with the leading edge of each knife during the grinding of the second bevel.

20. A knife grinder as set forth in claim 19, wherein spring means are provided to bias the leading edge of each knife into engagement with said guide pins.

21. A knife grinder as set forth in claim 18, wherein said grinding means includes a rotatable abrasive grinding wheel mounted on an axis parallel to the axis of rotation of the cutterhead.

22. In combination with a forage harvester of the type having a frame adapted to be propelled forwardly over a field of crop bearing material, a shear bar mounted on said frame, a rotatable cutterhead mounted for rotation about a generally transverse axis and having a plurality of knives mounted on its radial outer periphery, drive means including clutch means movable between engaged and disengaged positions and operable to rotate said cutterhead in a forward direction when said clutch means is in its engaged position whereby crop material conveyed past said shear bar will be cut by said knives during forward rotation of said cutterhead; a powered knife grinder comprising grinding means mounted on the frame adjacent the periphery of said cutterhead; means operable to move said grinding means towards and away from said cutterhead between an operative grinding position and an inoperative grinding position, means operable to hold the grinding means along a radial inner surface of each of the knives when said clutch means is in its disengaged position and said grinding means is disposed in its grinding position, and means operable to move said grinding means back and forth across the width of the cutterhead whereby a second bevel can be reground on each of the knives.

23. The combination set forth in claim 22, wherein said grinding means comprises a rotatable abrasive structure mounted for rotation about an axis generally parallel to the axis of said cutterhead, and further characterized by the provision of drive means interconnecting said rotatable abrasive structure with said forage harvester cutterhead drive means.

24. The combination set forth in claim 22, wherein the means operable to hold the grinding means along a radial inner surface comprises guide pins carried by and movable with the grinding means, and biasing means operable to bias the leading edge of each of the knives into engagement with said guide means when said clutch means is disconnected.

25. A knife sharpener for a forage harvester having a rotatable cutterhead with knives and comprising
an abrasive wheel for grinding relief bevels of said knives,
an adjustable support means for rotatably supporting said abrasive wheel and moving said wheel inwardly and outwardly from said cutterhead between operative and inoperative positions,
guide means on said adjustable support means for engaging the cutting edge of a knife, said guide means positioning the knife in relation to said wheel, and said guide means being spaced and angled in relation to said abrasive wheel to position said engaged knife and the abrasive wheel in a substantially constant relation to one another for grinding relief bevels over the changes in the position and diameter of the abrasive wheel, and
means operable to move said support means back and forth across the width of the cutterhead when said abrasive wheel is disposed in its operative position.

26. A knife sharpener as set forth in claim 25 wherein each of said guide means has a mounting portion and a knife engaging portion.

27. A knife sharpener as set forth in claim 26 wherein said knife engaging portions are sleeves rotatably mounted on said mounting portion.

28. A knife sharpener as set forth in claim 25 wherein said guide means are on opposite sides of said abrasive wheel whereby at least one pin is maintained in engagement with the knife being ground as the adjustable support is moved back and forth across the width of the cutterhead.

29. In a forage harvester having
a housing with spaced vertical side walls forming a comminuting chamber,
a cutterhead rotatably mounted in said chamber between said walls,
a plurality of longitudinally extending circumferentially arranged knives mounted on said cutterhead and subscribing a cutting cylinder on rotation of said cutterhead, and
a shear bar mounted on said housing parallel to and adjacent the cutting cylinder in cooperative relation with said knives for chopping crop material;
a knife sharpener comprising
an abrasive wheel,
carrier means rotatably supporting said abrasive wheel,
drive means connected to said abrasive wheel,
shaft-like means having a fixed axis and pivotally supporting said carrier,
an adjustable shaft mounted in said carrier means on the other side of said abrasive wheel from said shaft-like means,
an adjusting mechanism coupled to said adjustable shaft for moving said adjustable shaft, carrier means and abrasive wheel toward and away from said cutterhead to move said abrasive wheel to grind bevels on said knives of said cutterhead,
guide pins positionable to extend from said carrier means towards said cutterhead for engagement by one of said knives to position said engaged knife and said abrasive wheel in a substantially constant relation to one another for grinding a relief bevel therein over the changes in the position and diameter of said abrasive wheel.

30. A method of grinding first and second bevels on the knives of a forage harvester cutterhead while the knives are mounted on the cutterhead with a single grinding means mounted on the forage harvester comprising steps of:

A. connecting a drive to the cutterhead and rotating the cutterhead;

B. advancing the grinding means into engagement with the radial outer periphery of the rotating cutterhead;

C. moving the grinding means back and forth along the length of the rotating knives to grind the radial outer periphery of the knives;

D. repeating the advancing and moving steps until a satisfactory first bevel is ground on the radial outer periphery of the knives of the rotating cutterhead;

E. disconnecting said drive to the cutterhead and disposing the cutterhead in a free-wheeling mode;

F. advancing said grinding means into engagement with one of the knives at a location spaced slightly inwardly of the first bevel;

G. moving said grinding means back and forth along the length of said one knife to grind a second bevel;

H. repeating the advancing and moving steps F and G until a satisfactory second bevel is ground on said one knife; and I. repeating steps F, G and H with each of the other knives on the cutterhead until a satisfactory second bevel is ground on all the knives.

* * * * *